(12) United States Patent  (10) Patent No.: US 6,898,960 B1
Bodnar  (45) Date of Patent: *May 31, 2005

(54) INDOOR AIR QUALITY TEST APPARATUS

(76) Inventor: Michael D. Bodnar, 14300 - 202nd Ave., Elk River, MN (US) 55330

( * ) Notice: Subject to any disclaimer, the term of this patent is extended or adjusted under 35 U.S.C. 154(b) by 0 days.

This patent is subject to a terminal disclaimer.

(21) Appl. No.: 10/714,705

(22) Filed: Nov. 17, 2003

Related U.S. Application Data

(63) Continuation-in-part of application No. 10/106,663, filed on Mar. 26, 2002, now Pat. No. 6,672,134.

(51) Int. Cl.⁷ .......................... G01N 1/00; B01D 46/00
(52) U.S. Cl. ................. 73/28.04; 73/28.01; 73/863.23; 73/863.25; 95/287
(58) Field of Search ........................ 73/863.23, 863.25, 73/28.01, 28.04, 28.05, 28.06; 95/287

(56) References Cited

U.S. PATENT DOCUMENTS

| 4,235,098 A | 11/1980 | Tisch |
| 4,382,808 A | 5/1983 | Van Wormer, Jr. et al. |
| 4,544,386 A | 10/1985 | Trayford, III et al. |
| 4,649,760 A | 3/1987 | Wedding |
| 4,963,167 A | 10/1990 | Young |
| 5,012,681 A | 5/1991 | Lentzen |
| 5,192,343 A | 3/1993 | Henry |
| 5,205,155 A | 4/1993 | Cooper |
| 5,500,369 A | 3/1996 | Kiplinger |
| 5,593,470 A | 1/1997 | Shagott et al. |
| 5,717,147 A | 2/1998 | Basch et al. |
| 5,996,422 A | 12/1999 | Buck et al. |
| 6,540,805 B2 * | 4/2003 | Ohno et al. .................... 55/486 |
| 6,613,130 B2 * | 9/2003 | Givargis ....................... 95/287 |
| 6,672,134 B2 * | 1/2004 | Bodnar ....................... 73/28.01 |

FOREIGN PATENT DOCUMENTS

| JP | 02144113 A | 6/1990 | .............. 73 863.23 |
| JP | 03221839 A | 9/1991 | ............... 73 28.01 |

* cited by examiner

Primary Examiner—Michael Cygan
(74) Attorney, Agent, or Firm—Kinney & Lange, P.A.

(57) ABSTRACT

A method that allows an individual to personally test for contaminants in an air supply. The method consists of purchasing the test kit, mounting the test kit to an existing particulate filter, placing the mounted test kit and particulate filter into the filter housing and blowing air through the test kit. The test kit is then removed from the furnace, repackaged and sent to a laboratory for analysis. The air quality test kit comprises a test filter, a filter backing pad, a support and a pair of end caps. The test filter, the filter backing pad and the support form a device to capture and retain particles carried in an airflow.

12 Claims, 6 Drawing Sheets

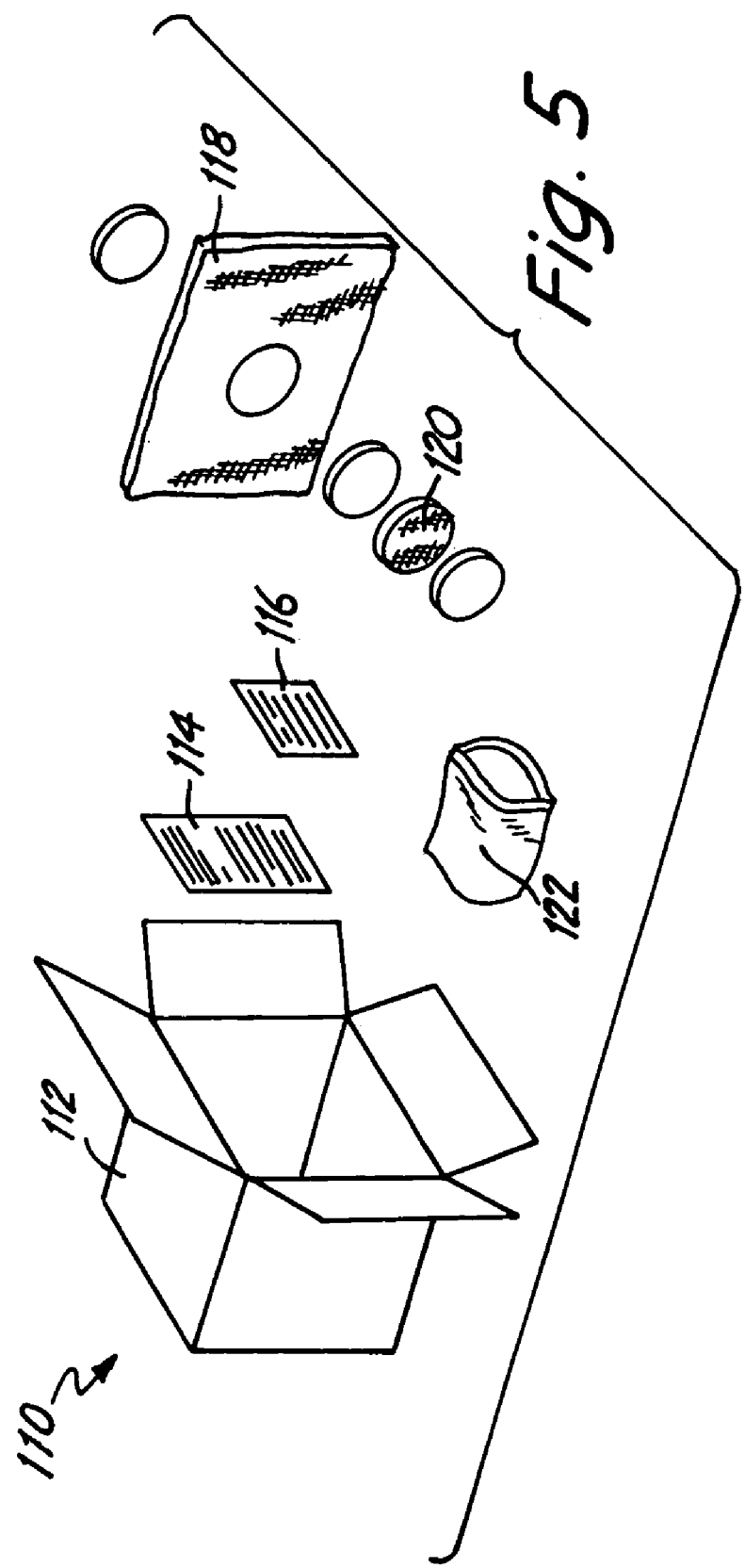

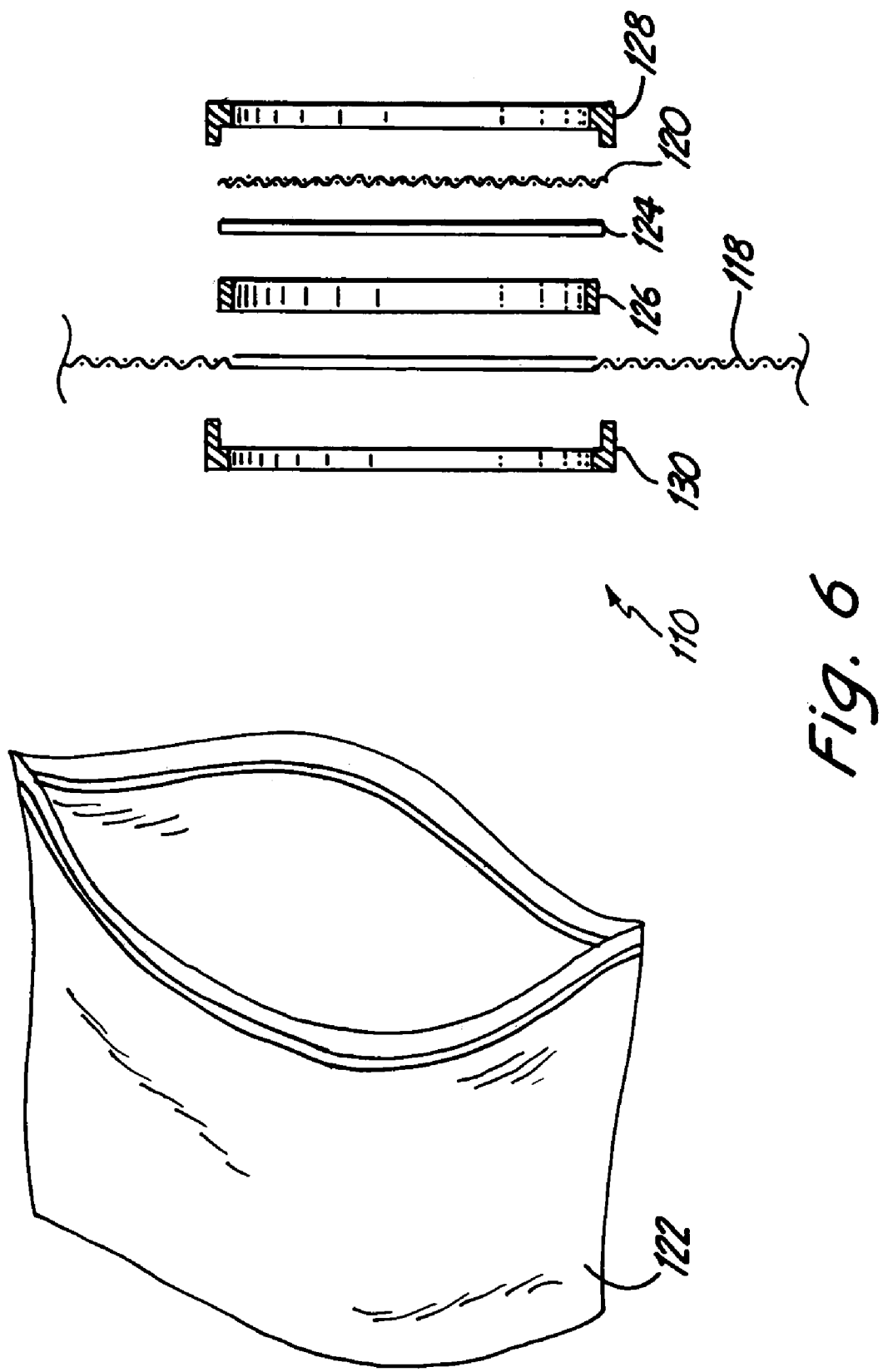

INDOOR AIR QUALITY TEST APPARATUS

CROSS-REFERENCE TO RELATED APPLICATION(S)

This is a Continuation-in-part of Ser. No. 10/106,663 filed Mar. 26, 2002, now U.S. Pat. No. 6,672,134 entitled Indoor Air Quality Test Apparatus.

BACKGROUND OF THE INVENTION

The present invention pertains to a method and a test kit to test for contaminants in an indoor air supply. More particularly, the invention pertains to a method and a test kit that allows an individual such as a homeowner to test for contaminants contained in an indoor air supply by utilizing the existing heating ventilation system.

There is always a concern over whether the presence of contaminants exist in the air supply of an indoor room. Such concern arises because human or animal inhalation of contaminants may lead to respiratory infections and diseases. Additionally, fungus growing in a room can corrode metal surfaces, create an unappealing sight, become a serious fire hazard, and increase energy costs due to lower performance levels of air delivery systems. Contaminants that may be inhaled include fumes, fibers, allergens, fungi, bacteria and any other matter that poses a risk to indoor air quality.

The detection of contaminants in an indoor environment is crucial because most people cannot visually tell whether a room is contaminated. In addition, indoor rooms often do not have the appropriate ventilation to eliminate contaminants without the aide of experts. Therefore, various techniques have attempted to provide a means for detecting contaminants.

One technique is to call upon industrial hygienists. An industrial hygienist will visit a particular site and perform air monitoring tests utilizing special equipment. This technique, however, is labor intensive and often cost prohibitive, particularly for a residential homeowner.

A simple technique to detect the presence of contaminants in an indoor air supply is presently not available. The present invention is directed at a simple, inexpensive test kit and method to detect the presence of contaminants in an indoor air supply.

BRIEF SUMMARY OF THE INVENTION

The invention is a method and a device that allows an individual to test for contaminants in an indoor air supply. The homeowner purchases the test kit which includes a test filter and a support. The test filter is made of a material that will capture and retain contaminants carried in the air. The support includes a central opening to which the test filter is attached. The homeowner then removes the particulate filter from the heating and ventilation system so that the test filter and support can be mounted onto the particulate filter. The test filter is mounted onto the particulate filter with the help of the support. The mounted support, test filter and particulate filter are returned to the filter housing. The blower of the heating and ventilation system is then operated for a predetermined amount of time. The blower is then turned off and the support and test filter are removed from the particulate filter, repackaged and sent to a laboratory for analysis.

BRIEF DESCRIPTION OF THE DRAWINGS

FIG. 5 is a perspective view of an alternate embodiment of the test kit.

FIG. 6 is a cross-sectional, exploded view of the alternate test kit.

DETAILED DESCRIPTION

Figure 1:
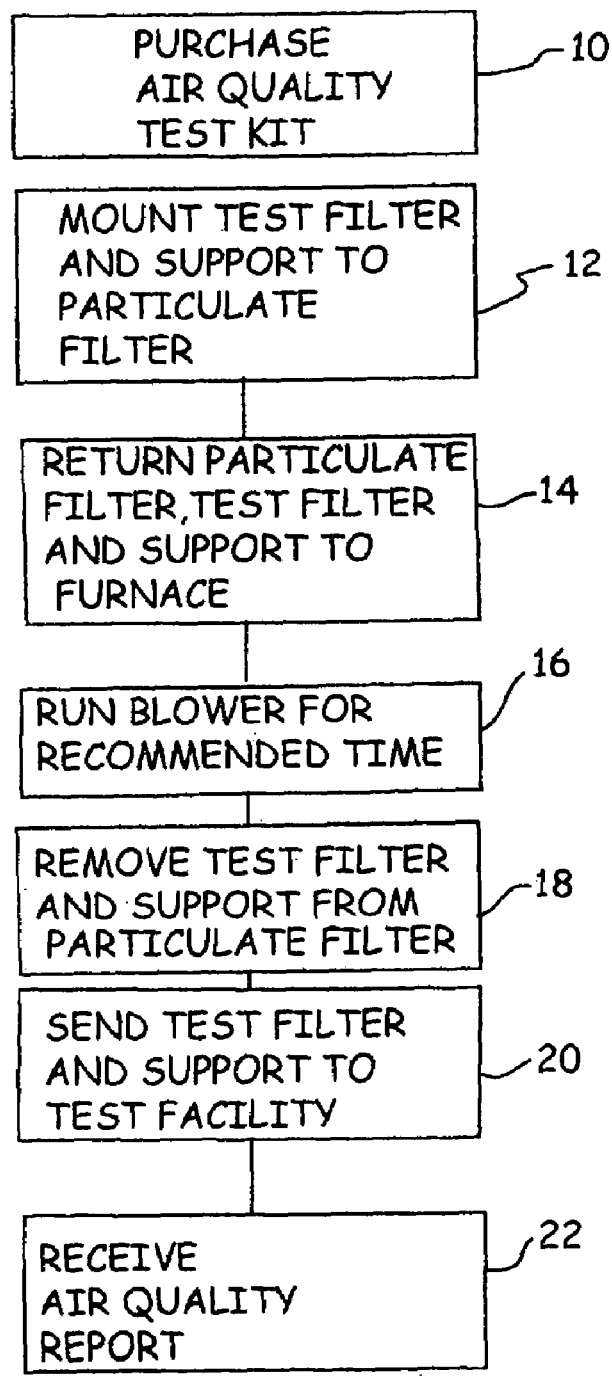
FIG. 1 is a block diagram illustrating the method of use of the test kit.

The present invention allows a homeowner to perform a test for airborne contaminants in a home or other building. FIG. 1 is a diagram illustrating use of the invention. The method of using the invention includes seven steps that will be explained below. The first step is that a homeowner purchases a pre-assembled test kit. (Step 10). The test kit is sold in a package that includes a test filter and a support which will be described in detail in conjunction with FIGS. 2–4. The test kit also includes instructions for use and a questionnaire to be filled out when submitting the test kit for analysis.

Second, the test filter and the support are mounted on an already existing particulate filter. (Step 12). To apply the test filter and the support to the particulate filter, the homeowner takes the purchased test kit home and removes the test kit from the box or other packaging. The homeowner then removes the existing particulate filter from the heating and ventilation system. The test filter and the support are then mounted on the existing particulate filter with the test filter facing up stream so that air flow passes through the test filter before passing through the particulate filter.

Third, the mounted test filter, support and particulate filter are returned to the existing particulate filter opening. (Step 14).

Fourth, the blower of the heating and ventilation system is then operated for a recommended length of time that is specified in the test kit instructions. (Step 16). The blower will cause air to flow through the test filter. As air moves through the test filter, the test filter will capture and retain air contaminants.

Fifth, after the specified period of blower operation, the homeowner removes the mounted test filter, support and particulate filter from the furnace. The test filter and the support are then removed from the particulate filter. (Step 18).

Sixth, the test filter and the support are then repackaged and sent to a test facility with a request for analysis. (Step 20). Along with the test filter and the support, the questionnaire provided with the test kit is filled out and sent to the test facility to assist the test facility in interpreting the contaminants collected by the test kit.

Seventh, the test facility performs an analysis on the test filter and provides an air quality report to the homeowner. (Step 22).

Figure 2:
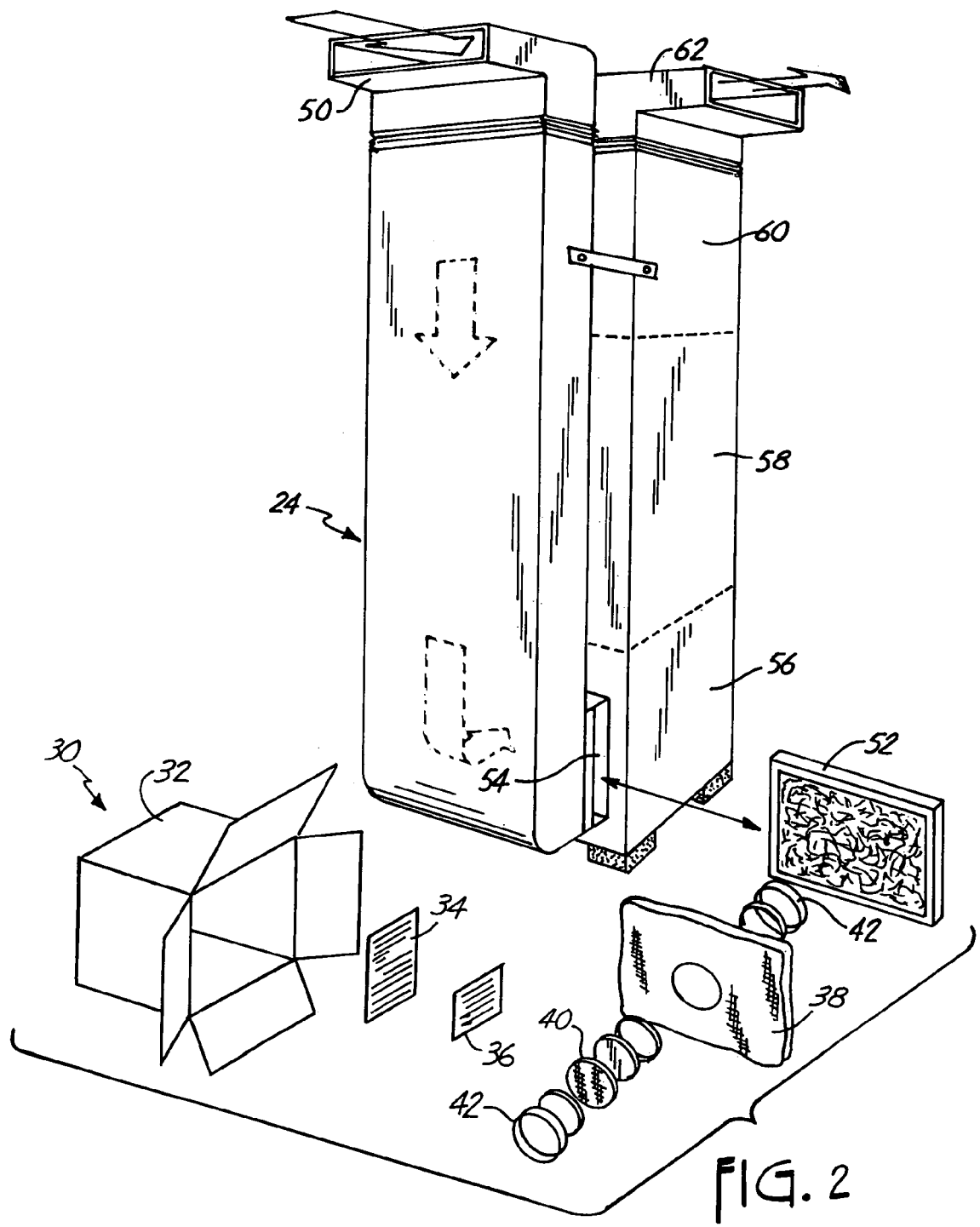
FIG. 2 is a perspective view of a standard heating and ventilation system along with the test kit.

A typical home heating and ventilation system 24 along with the test kit 30 are shown in FIG. 2 in order to further explain how the present invention is used. The test kit 30 comprises a package 32, a set of instructions 34, a questionnaire 36, a support 38, a test filter 40 and a pair of end caps 42. The test kit 30 is a pre-assembled kit stored within the package 32. The package 32 can be a box or any sort of container that can hold objects. The test kit 30 includes the set of instructions 34 and the questionnaire 36. The instructions 34 explain how to use and install the test kit 30. The questionnaire 36 is a series of questions that must be answered by the user of the test kit 30. The questionnaire 36 assists the test facility in interpreting the contaminants collected by the test kit 30 to ensure more accurate results.

The test kit 30 also includes the support 38, the test filter 40 and the pair of end caps 42. The support 38 includes a central opening to which the test filter 40 is attached. The end caps 42 cover the test filter 40 when the test kit 30 is not in use. However, when the end caps 42 are removed, the support 38 and the test filter 40 are ready for use and installation into the heating and ventilation system 24.

The heating and ventilation system 24 also includes several components. Air enters the heating and ventilation system 24 through a cold air return duct 50. The air travels down the cold air return duct 50 and through a particulate filter 52 which is located within a filter housing 54. As air passes through the particulate filter 52, particles are captured and retained by the particulate filter 52. The particulate filter 52 is shown as horizontally inserted within the filter housing 54. Alternatively, the particulate filter 52 may be vertically inserted within the filter housing 54. The filtered air then passes through a blower 56. The blower 56 forces the filtered air through a heat exchanger 58 and a set of air conditioning coils 60. The heat exchanger 58 and the air conditioning coils 60 mix the air to obtain a desired air temperature. Once the desired air temperature is reached, the blower 56 forces the air out of the heating and ventilation system 24 through a heating duct 62 and into various rooms of a residence.

As illustrated in FIG. 2, the support 38 and the test filter 40 are mounted on the particulate filter 52. The support 38 and the test filter 40 are mounted on the particulate filter 52 by wrapping the support 38 around and in the middle of the particulate filter 52. The mounted support 38, test filter 40 and particulate filter 52 are then inserted into the filter housing 54 with the support 38 and the test filter 40 facing up stream so that air passes through the support 38 and the test filter 40 before passing through the particulate filter 52. Once the particulate filter 52 with the support 38 and the test filter 40 are inserted, the blower 56 is operated to draw air through the support 38, the test filter 40 and the particulate filter 52. As air passes through the test filter 40, the test filter 40 captures and retains particles carried in the air. The particles remain trapped within the test filter 40 for analysis.

Figure 3:
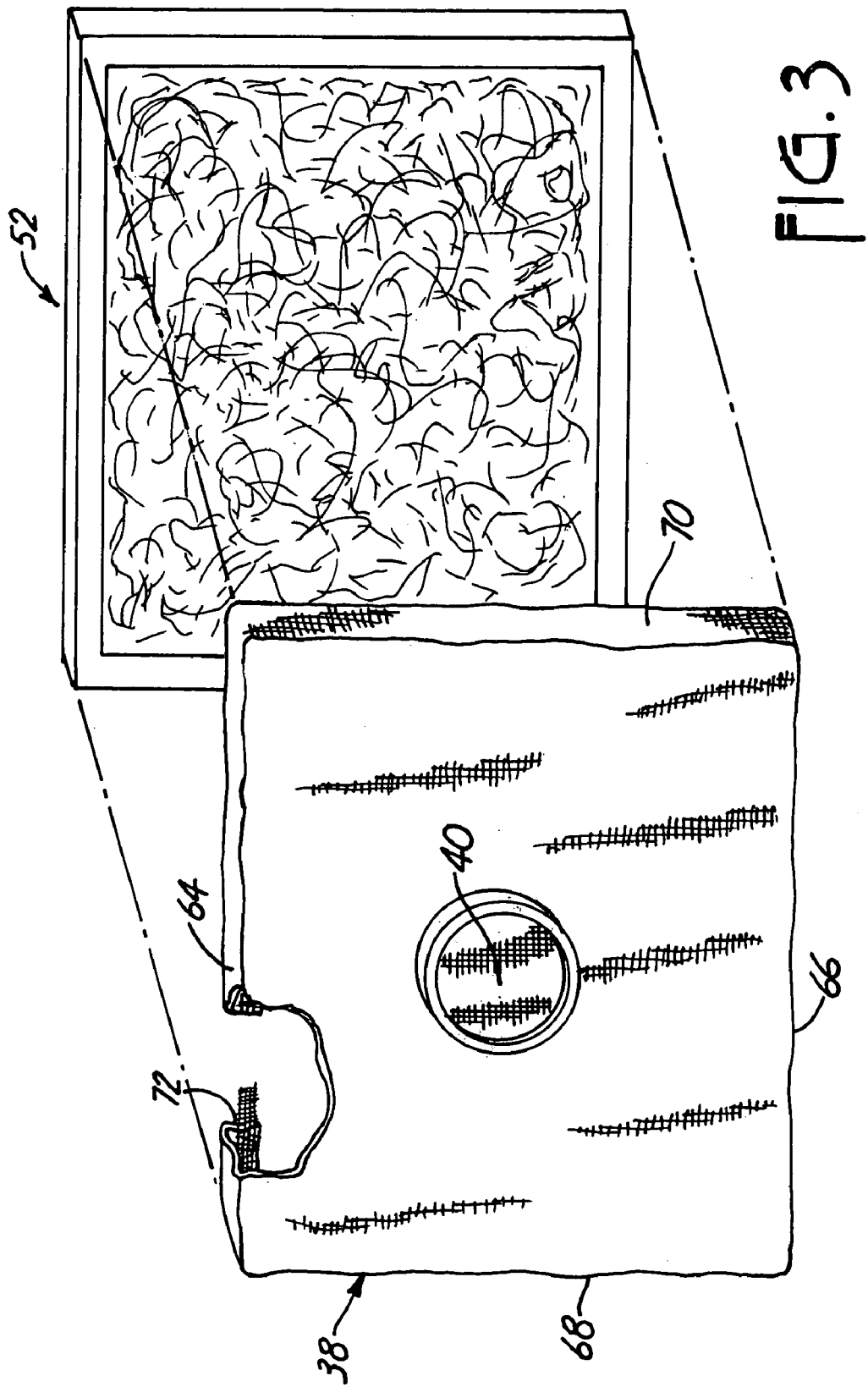
FIG. 3 is a perspective view of the support, test filter and particulate filter.

FIG. 3 is an enlarged view of the support 38, the test filter 40 and the particulate filter 52. The support 38 has a top 64, a bottom 66, a first side 68 and a second side 70. The support 38 is preferably made of a cardboard material so that the user can cut the top 64, the bottom 66, the first side 68 or the second side 70 to fit within and across the filter housing 54. The support 38 could also be made of any material that has sufficient flexibility and rigidity to maintain its shape such as plastic.

The support 38 preferably has a length from the top 64 to the bottom 66 that is approximately equal to the height of the filter housing 54. This length is preferred because the top 64 and the bottom 66 support themselves against the walls of the filter housing 54. Additionally, the width of the support 38 from the side 68 to the side 70 is approximately equal to the width of the filter housing 54. This width is preferred because the sides 68 and 70 support themselves against the walls of the filter housing 54.

Additionally, the support 38 has an elastic material 72 attached to the top 64, the bottom 66, the first side 68 and the second side 70. The elastic material 72 allows the support 38 to fit and remain around the existing particulate filter 52. If there is excess elastic material 72 after the support 38 is wrapped around the particulate filter 52, any type of fastening device, such as a clip, may be used to hold the excess material.

The support 38 includes a central opening. Across the central opening, the test filter 40 is attached. The test filter 40 is preferably a 37 millimeter, mixed—cellulose ester, 0.8 mm filter. The test filter 40, however, can be made of any material which will capture and retain contaminants in an airflow. As air passes through the test filter 40, the test filter 40 captures and retains particles carried in the air. The particles remain trapped within the test filter 40 for analysis.

The support 38 and the test filter 40 are designed to have a similar air porosity. The test filter 40 is not sealed to force all the air through the test filter 40. This ensures even airflow through the support 38 and the test filter 40. Additionally, this allows the test filter 40 to have a smaller size than the particulate filter 52 which allows for ease of manufacturing and is more economical because there is not the need to make the test filter 40 the full size of the particulate filter 52. A combination of filtration and impaction are used to capture and measure the airborne contaminants. Airborne contaminants with momentum will stick to the test filter 40 surface. Also, contaminants that are carried in the air that is forced to go directly through test filter 40 will stick to the test filter 40 surface.

Figure 4:
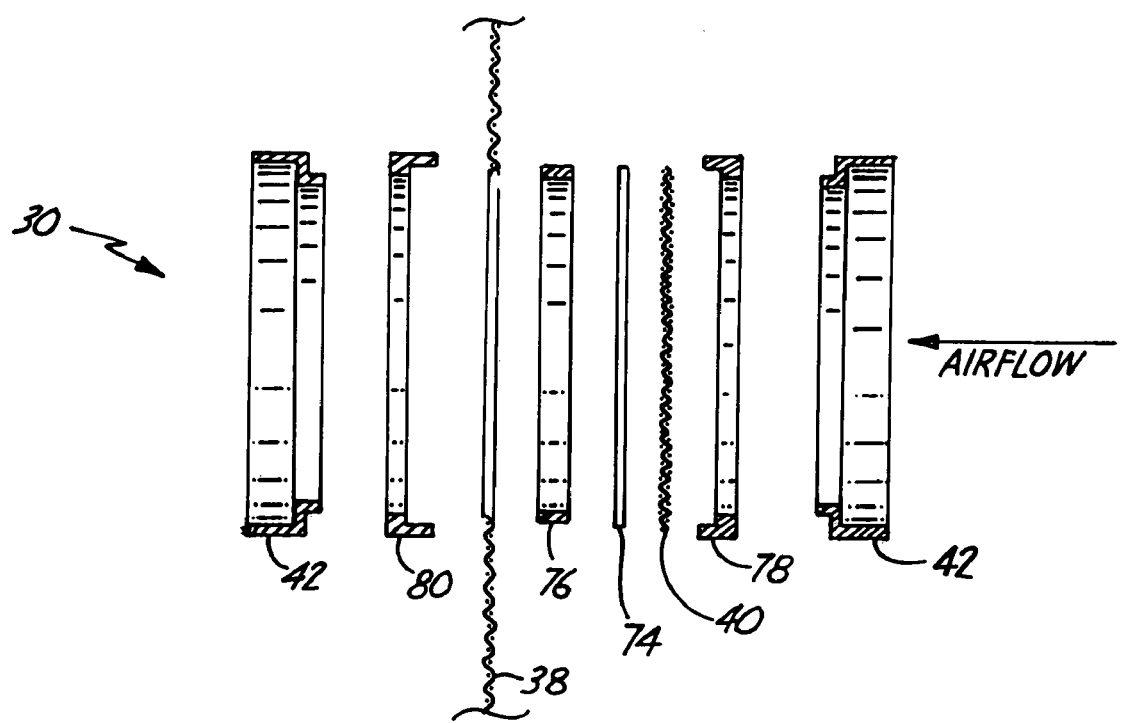
FIG. 4 is a cross-sectional, exploded view of the test kit.

FIG. 4 shows a more detailed view of the components comprising the test kit 30. As shown in FIG. 4, the test kit 30 includes the support 38, the test filter 40, the end caps 42, a filter backing pad 74, a barrel 76, a filter cowl 78 and a support cowl 80.

The filter backing pad 74 is positioned such that it is sandwiched between the support 38 and the test filter 40. The test filter 40 is mounted on the filter backing pad 74 such that the filter backing pad 74 provides support for the test filter 40. The filter backing pad 74 is preferably made of a material with a low restrictive airflow that is sturdy enough to support the test filter 40 such as paper or mesh screen. Additionally, the test kit 30 is designed such that the pressure loss through the test filter 40 and the filter backing pad 74 approximately equals the pressure loss of air flowing through the support 38. This ensures that there is a uniform pressure across the support 38, the test filter 40 and the filter backing pad 74.

The test filter 40 and the filter backing pad 74 are secured to a mounting assembly consisting of a support barrel 76 and a filter cowl 78. The mounting assembly mounts the test filter 40 and the filter backing pad 74 across the central opening of the support 38. Alternatively, the test filter 40 and the filter backing pad 74 could be attached and held in place to the support 38 by the filter cowl 78 alone, thus, eliminating the need for the support barrel 76. The support 38 is held in place by the support cowl 80. The filter cowl 78 and the support cowl 80 are preferably made of a non-conductive material.

A pair of removable end caps 42 are used to cover the test filter 40 when the test kit 30 is not in use. The end caps 42 are secured to both the filter cowl 78 and the support cowl 80 when the test kit 30 is not in use. As indicated in FIG. 4, the end caps 42 can either be snapped (friction fit) or threaded into the filter cowl 78 and the support cowl 80. The end caps 42 should be secured during shipment and storage of the test kit 30 in order to preserve the condition and contents of the test filter 40 before and after testing. When the test kit 30 is in use, the end caps 42 are removed.

FIG. 5 is a perspective view of an alternate embodiment of the test kit 110. The test kit 110 comprises a package 112, a set of instructions 114, a questionnaire 116, a support 118, a test filter 120 and a container 122. The test kit 110 is a pre-assembled kit stored within the package 112. The package 112 can be a box or any sort of container that can hold objects. The test kit 110 includes the set of instructions 114 and the questionnaire 116. The instructions 114 explain how to use and install the test kit 110. The questionnaire 116 is a series of questions that must be answered by the user of the test kit 110. The questionnaire 116 assists the test facility in interpreting the contaminants collected by the test kit 110 to ensure more accurate results.

The test kit 110 also includes the support 118, the test filter 120 and the container 122. The support 118 includes a central opening to which the test filter 120 is attached. The test filter 120 is preferably approximately a 50 square millimeter, mixed—cellulose ester. The support 118 is preferably made of a porous cardboard material. The container 122 covers the test filter 120 when the test kit 110 is not in use. However, when the support 118 and the test filter 120 are removed from the container 122, the support 118 and the test filter 120 are ready for use and installation into the heating and ventilation system.

FIG. 6 shows a more detailed view of the components comprising the alternate test kit 110. As shown in FIG. 6, the test kit 110 includes the support 118, the test filter 120, the container 122, a filter backing pad 124, a front cover 126, a filter cowl 128 and a support cowl 130.

The filter backing pad 124 is positioned such that it is sandwiched between the support 118 and the test filter 120. The test filter 120 is mounted on the filter backing pad 124 such that the filter backing pad 124 provides support for the test filter 120. The filter backing pad 124 is preferably made of a material with a low restrictive airflow that is sturdy enough to support the test filter 120 such as paper or mesh screen. Additionally, the test kit 110 is designed such that the pressure loss through the test filter 110 and the filter backing pad 124 approximately equals the pressure loss of air flowing through the support 118. This ensures that there is a uniform pressure across the support 118, the test filter 120 and the filter backing pad 124.

The test filter 120 and the filter backing pad 124 are secured to a mounting assembly consisting of a front cover 126 and a filter cowl 128. The mounting assembly mounts the test filter 120 and the filter backing pad 124 across the central opening of the support 118. The support 118 is held in place by the support cowl 130. The front cover 126 is preferably made of a non-porous cardboard material. The filter cowl 128 and the support cowl 130 are preferably made of a non-conductive material.

The container 122 is used to cover the test filter 120 when the test kit 110 is not in use. The container 122 should be secured during shipment and storage of the test kit 110 in order to preserve the condition and contents of the test filter 120 before and after testing. When the test kit 110 is in use, the test kit 110 is removed from the container 122. The container 122 can be of any type as long as the test filter 120 fits inside the container 122 when not in use. One example of the container 122 is depicted in FIGS. 5–6, which shows a plastic bag with a self sealing connection. Other examples of the container 122 are a molded plastic container that seals or a sealable cardboard box.

Although the present invention has been described with reference to preferred embodiments, workers skilled in the art will recognize that changes may be made in form and detail without departing from the spirit and scope of the invention. For example, when the mounted support 38, test filter 40 and particulate filter 52 are inserted into the filter housing 54, the support 38 and the test filter 40 can face downstream. Testing the air quality on both the upstream and downstream sides allows a homeowner to determine how effective the particulate filter 52 is working. However, testing on both the upstream and downstream sides of the heating and ventilation system 24 requires the use of two test kits 30 increasing the cost to the homeowner.

Although the present invention has been described with reference to preferred embodiments, workers skilled in the art will recognize that changes may be made in form and detail without departing from the spirit and scope of the invention.

What is claimed is:

1. An air quality test kit that allows an individual to personally test for contaminants in a heating and ventilation system of a type having a blower and a filter housing for receiving a particulate filter, the test kit comprising:
   a test filter of a predetermined area that will capture and retain particles carried in an airflow such that the particles remain trapped within the test filter for analysis; and
   a support shaped to fit in the filter housing for supporting the test filter adjacent to the particulate filter within the filter housing, wherein the support is a porous cardboard material.

2. The test kit of claim 1, wherein the test filter is supported by a filter backing pad.

3. The test kit of claim 1, wherein the support includes a central opening to which the test filter is attached.

4. The test kit of claim 1 including a container for holding the test filter when not in use.

5. The test kit of claim 1, wherein the test filter is approximately 50 square millimeters mixed cellulose ester.

6. The test kit of claim 1, wherein the test filter is attached to the support by a mounting assembly.

7. An air quality test kit that allows an individual to personally test for contaminants in a heating and ventilation system of a type having a blower and a filter housing for receiving a particulate filter, the test kit comprising:
   a test filter made of material which will capture and retain particles carried in an airflow such that the particles remain trapped within the test filter for analysis;
   a filter backing pad to support the filter; and
   a support made of a porous cardboard material shaped to fit in the filter housing for supporting the test filter and the filter backing pad adjacent to the particulate filter within the filter housing, wherein the support includes a central opening to which the test filter and the filter backing pad are attached.

8. The test kit of claim 7, including a container for holding the test filter when not in use.

9. The test kit of claim 7, wherein the test filter is approximately 50 square millimeters mixed cellulose ester.

10. The test kit of claim 7, wherein the test filter and the filter backing pad are secured to a front cover.

11. The test kit of claim 7, wherein there is a uniform pressure across the support, the test filter and the filter backing pad.

12. An air quality test kit that allows an individual to personally test for contaminants in a heating and ventilation system of a type having a blower and a filter housing for receiving a particulate filter, the test kit comprising:
   a test filter made of material which will capture and retain particles carried in an airflow such that the particles remain trapped within the test filter for analysis;
   a filter backing pad to support the filter;
   a support made of a porous cardboard material shaped to fit in the filter housing for supporting the test filter and the filter backing pad adjacent to the particulate filter within the filter housing, wherein the support includes a central opening to which the test filter and the filter backing pad are attached; and
   a front cover to which the test filter and the filter backing pad are secured, wherein the front cover is a non-porous cardboard material.

* * * * *